United States Patent [19]

Finney et al.

[11] 4,028,002

[45] June 7, 1977

[54] ROTOR BLADE RETENTION SYSTEM

[75] Inventors: Robert H. Finney; Warren E. Schmidt, both of Erie, Pa.

[73] Assignee: Lord Corporation, Erie, Pa.

[22] Filed: Mar. 1, 1976

[21] Appl. No.: 662,476

[52] U.S. Cl. .............................. 416/134 A; 416/141
[51] Int. Cl.² .......................................... B64C 27/38
[58] Field of Search ............... 416/134, 134 A, 141

[56] References Cited

UNITED STATES PATENTS

| | | | |
|---|---|---|---|
| 3,292,712 | 12/1966 | Schmidt | 416/141 |
| 3,556,673 | 1/1971 | Killian | 416/141 X |
| 3,652,185 | 3/1972 | Cresap et al. | 416/134 A |
| 3,759,631 | 9/1973 | Rybicki | 416/134 A |
| 3,764,230 | 10/1973 | Rybicki et al. | 416/141 X |
| 3,782,854 | 1/1974 | Rybicki | 416/134 |
| 3,829,239 | 8/1974 | Rybicki et al. | 416/134 A |
| 3,862,812 | 1/1975 | Gorndt et al. | 416/141 |

*Primary Examiner*—Everette A. Powell, Jr.
*Attorney, Agent, or Firm*—Maurice R. Salada

[57] ABSTRACT

A rotor blade retention system connects an elongated rotor blade to a rotor hub that is rotatable about its central axis. The connected rotor blade normally extends generally radially from the hub and is rotatable with the hub. The retention system includes at least three laminated elastomeric bearings connected together in serial compression load transmitting relationship. Each laminated bearing includes a plurality of alternating and bonded together layers of elastomeric material and substantially inextensible material. The layers of each of the serially interconnected bearings are at least partially inclined relative to the longitudinal axis of the rotor blade. In section taken radially of the longitudinal axis of the blade, at least a portion of each layer of each bearing projects longitudinally toward an end of the rotor blade. Preferably, only one of the serially interconnected bearings is rigidly connected to the rotor blade. The rotor blade is spaced radially, relative to its longitudinal axis, from at least all portions of the retention system other than the bearing to which the blade is rigidly connected.

8 Claims, 2 Drawing Figures

ROTOR BLADE RETENTION SYSTEM

BACKGROUND OF THE INVENTION

One conventional method of mounting the blades of a helicopter rotor on the rotor hub is to provide an articulated blade retention system between each rotor blade and the hub. Early proposals for articulated rotor blade retention systems incorporated antifriction bearings, such as roller bearings or ball bearings, to provide the necessary articulation. More recently, articulated retention systems have been developed which incorporate one or more laminated elastomeric bearings, rather than antifriction bearings. Such laminated bearings comprise a plurality of alternating and bonded together layers of elastomeric material and a substantially inextensible material. The bearings do not require lubrication, have only limited maintenance requirements and afford a reduction in weight as compared to antifriction bearings. The advantages of laminated elastomeric bearings are such that the bearings have found widespread use and acceptance throughout the helicopter industry and have been incorporated in a number of different helicopter rotor blade retention systems.

One fully articulated blade retention system that incorporates laminated elastomeric bearings is described and illustrated in a number of related patents assigned to United Aircraft Corporation (now United Technologies Corporation). The patents are Rybicki U.S. Pat. No. 3,759,631, Rybicki U.S. Pat. No. 3,759,632, Rybicki U.S. Pat. No. 3,782, 854, Rybicki et al U.S. Pat. No. 3,764,230 and Rybicki et al U.S. Pat. No. 3,829,239. As shown in each of the Rybicki patents, the United Aircraft retention system secures each rotor blade to a rotor hub by two serially interconnected, laminated elastomeric bearings. One laminated bearing, which has annular, disc-shaped laminations, resists centrifugal loads on the rotor blade and accommodates oscillatory pitch change movements of the blade about its longitudinal axis. The other bearing, which has annular, spherically shaped laminations, also resists centrifugal loads on the rotor blade and accommodates pitch change, flapping and lead-lag movements of the blade. (Lead-lag and flapping movements are oscillatory movements within and perpendicular to, respectively, the plane of rotation of the rotor blades.) Since the pitch change movements of the blade are of a relatively large magnitude (e.g. 10° to 15° or more in each rotational direction), particularly when compared to the lead-lag and flapping motions, the combined torsional movement capabilities of the two laminated bearings must also be relatively large. For economic and space reasons, the bearing having disc-shaped laminations is designed to accommodate a greater proportion of the torsional motion. As a result, the disc-type or thrust bearing is relatively tall or long.

As the height or length of a disc-type laminated bearing is increased, the bearing becomes increasingly unstable in a lateral or radial direction. The lateral instability of a tall disc-type bearing may be accentuated in a rotor blade retention system because the rotor blade, when in motion, tends to move bodily in radial directions relative to its centerline. If only one end of a laminated elastomeric bearing is rigidly connected to the rotor blade, translational shifts of the blade will subject the bearing to shear loads both in and out of the plane of rotation of the blade and rotor, as is explained in the Rybicki 3,759,631 and 3,759,632 patents, for example. Such in-plane and out-of-plane translational shear loads on a laminated bearing are in addition to shear loads exerted on the bearing by pivotal lead-lag and flap motions of the rotor blade.

In the United Aircraft blade retention system, an effort has been made to improve the lateral stability of the constituent disc-type laminated bearing by insuring that opposite ends of the bearing do not move out of axial alignment. The end plates of the disc-type bearing are closely fitted around the root or mounting shaft portion of the associated rotor blade so that translational movements of the blade or pivotal movements of the blade about any axis other than its longitudinal axis do not move the ends of the bearing laterally relative to each other. If the disc-type bearing is to accommodate pitch change movements of the blade, however, one end of the bearing must rotate relative to the other end about the longitudinal blade axis. As shown in the Rybicki '631, 3,759,632, 3,782,854 and 3,829,239 patents, one end plate of the disc-type bearing, or a rigid member secured to the end plate, slides on and about the circumference of the rotor blade mounting shaft. Such a sliding action necessarily involves a severe wear problem. Although the Rybicki patents show Teflon or carbon faced sliding or shear bearings between the end plate of the laminated bearing and the blade shaft, such shear bearings have proved to be only partially successful in eliminating wear for extended periods while maintaining the ends of the laminated disc-type bearing in alignment.

Another version of the United Aircraft retention system, as shown in the Rybicki et al. 3,764,230 patent, incorporates a cylindrical laminated elastomeric bearing between the disc-type thrust bearing and the spherical bearing and in parallel load transmitting relationship with the disc-type bearing. Since the annular or tubular laminations of the cylindrical laminated bearing are concentric with the rotor blade mounting shaft, the radially inner "end" plate or race of the bearing can be fixed to the blade shaft. Pitch change movements of the blade are accommodated through relative rotation between the inextensible layers in the bearing and related shearing of the elastomeric layers. Although the use of such a laminated shear bearing reduces the wear problem associated with a sliding bearing, there remains some possibility of slippage between the inner rigid race of the bearing and the mounting shaft and, more importantly, the prospect of a difficult and expensive effort to replace the bearing when it ultimately requires replacement.

One possible approach to overcoming the difficulties encountered with the United Aircraft rotor blade retention system is to substitute the retention system shown in Gorndt et al U.S. Pat. No. 3,862,812. Like the United Aircraft retention system, the retention system of the Gorndt et al patent utilizes two serially interconnected laminated bearings. In one embodiment of the Gorndt et al system, however, the inboard laminated bearing is a frustoconically shaped laminated bearing, rather than a disc-type laminated bearing. The frustoconically shaped laminated bearing has the lateral stability lacking in the disc-type bearing of the United Aircraft blade retention system. Thus, the only contact necessary between the rotor blade and the two serially interconnected laminated bearings of the Gorndt et al. retention system is at the end of the rotor blade that is connected to the frustoconically shaped laminated bearing. The two laminated bearings are connected through a rigid annular connecting member that encircles the mounting shaft of the rotor blade yet is spaced radially from the shaft.

Although the Gorndt et al blade retention system eliminates the frictional wear problems associated with the United Aircraft blade retention system, the conical bearing of Gorndt et al. must have excessively large outer dimensions in order to accommodate an amount of torsional pitch change movement comparable to the amount of torsional pitch change movement that can be accommodated by the disc-type bearing of the United Aircraft retention system. Moreover, as the outer dimensions of a conical bearing are increased, the torsional spring rate of the bearing is also increased and the bearing becomes more resistant to torsional movement. Thus, as the dimensions of the Gorndt et al. conical bearing are increased to provide a number of elastomeric layers sufficient to accommodate large pitch change movements, the torsional stiffness of the bearing will increase and the spherical laminated bearing will be deflected in preference to the conical bearing during pitch change movements of the rotor blade. The preferential flexing of the spherical bearing will require a large spherical bearing with a resulting increase in torsional stiffness. Attempting to use the Gorndt et al retention system as a substitute for the United Aircraft system will therefore result in a larger, heavier system with a higher overall torsional spring rate.

SUMMARY OF THE INVENTION

The present invention is directed to a fully articulated rotor blade retention system which incorporates a plurality of laminated elastomeric bearings and which may be utilized as a substitute for the retention system described and illustrated in the previously mentioned Rybicki patents. According to the invention, the rotor blade retention system comprises at least three laminated elastomeric bearings connected together in serial compression load transmitting relationship. Each laminated bearing includes a plurality of alternating and bonded together layers or laminations of elastomeric material and substantially inextensible material. Each layer of each of the serially interconnected laminated bearings is at least partially inclined relative to a longitudinal axis of the rotor blade that is mounted by the system. In section taken radially of the longitudinal blade axis, at least a portion of each layer of each laminated bearing projects longitudinally towards an end of the rotor blade.

In a preferred embodiment of the invention, specifically intended as a replacement for the United Aircraft (Rybicki) blade retention system, the rotor blade is spaced radially, relative to its longitudinal axis, from at least all portions of the retention system other than a single laminated bearing to which the blade is rigidly connected. One of the serially interconnected laminated bearings has annular, spherically shaped layers or laminations, while the other two serially interconnected laminated bearings have annular, frustroconically shaped laminations. The two frustroconical laminated bearings are disposed adjacent to each other such that the laminations of one frustroconical bearing taper in circumference toward one end of the rotor blade and the laminations of the other frustroconical bearing taper in circumference toward the other end of the rotor blade. The root or mounting shaft portion of the rotor blade passes through a central opening in each laminated bearing. The spherical laminated bearing is rigidly connected to the rotor hub, while the frustroconical bearing farthest from the spherical bearing is rigidly connected to the shaft portion of the rotor blade. All three serially interconnected laminated bearings share pivotal movements of the rotor blade about its longitudinal axis.

The adjacent, frustroconical laminated bearings of the preferred embodiment of the present invention may be said to replace the disc-type laminated bearing of the United Aircraft blade retention system. Like the disc-type laminated bearing, the two frustroconical bearings accommodate pivotal pitch change motions of the rotor blade. At the same time, however, the frustroconical shape of the laminations of the two bearings provides lateral stability for the bearings and permits the bearings to be spaced radially from the shaft of the rotor blade. Thus, no sliding or shear bearing is required and the persistent wear problem of the United Aircraft blade retention system is entirely eliminated.

The preferred embodiment of the present invention is also a more feasible and advantageous substitute for the United Aircraft retention system than is the blade retention system of the Gorndt et al '812 patent. The use of two frustroconical laminated bearings permits each bearing to have a relatively small size (e.g. outer circumference), yet permits the bearings together to accommodate an amount of pitch change motion equivalent to the motion accommodated by the disc-type bearing of the United Aircraft system. The small size of the bearings means a small total weight, relative to a single, large conical bearing, because of the reduced size of the metal components, such as the inextensible laminations, incorporated in the two bearings. The use of two frustroconical bearings also produces, because of the small size of each bearing, a torsional spring rate for each of the bearings that is smaller than the spring rate for a single, large frustroconical bearing. The smaller torsional spring rate permits the two frustroconical bearings to accommodate a greater proportion of the pitch change motion, relative to the spherical laminated bearing, than a single, larger frustroconical bearing. Since pitch change motion accommodation is the critical design factor for the spherical laminated bearing, the less pitch change motion the spherical bearing has to accommodate, the smaller and lighter the spherical bearing can be.

BRIEF DESCRIPTION OF THE DRAWING

For better understanding of the invention, reference may be made to the following description of an exemplary embodiment, taken in conjunction with the figures of the accompanying drawing, in which.

DESCRIPTION OF AN EMBODIMENT

Figure 1:
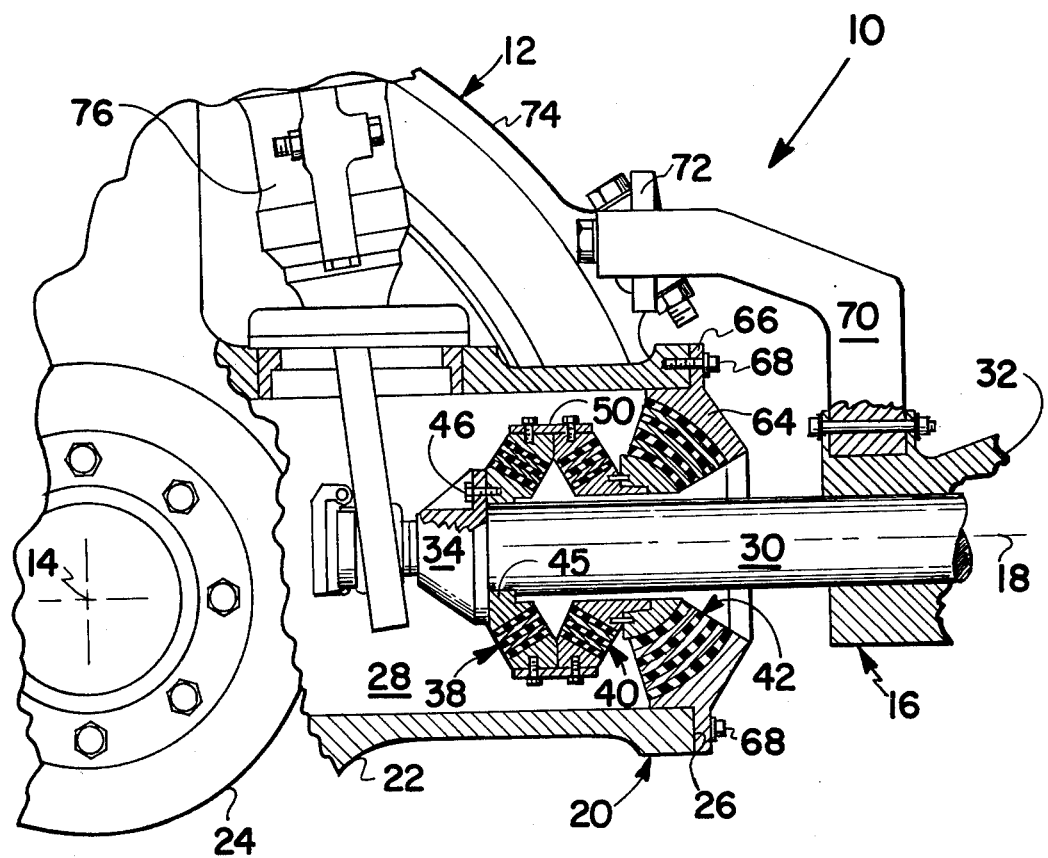
FIG. 1 is a top view, partly in section, of a fully articulated helicopter rotor incorporating the rotor blade retention system of the present invention.

FIG. 1 of the drawing illustrates a portion of a fully articulated helicopter rotor 10 that includes a rotor hub 12 rotatably driven about its central axis 14 by a conventional drive assembly (not shown). A plurality of rotor blades 16 are coupled to the hub 12 for rotation with the hub about its central axis 14. Each blade 16 is normally disposed with its longitudinal axis 18 extending generally radially from the hub 12. Although only a single rotor blade 16 is shown in the drawing, the rotor hub 12 will typically mount four such rotor blades 16.

The illustrated rotor blade 16 is coupled to the hub 12 by a blade retention system generally designated 20. The retention system 20 includes a tubular housing portion 22 of the hub 12 which extends generally radially outwardly from the central axis 14 of the hub. In the illustrated embodiment, the housing portion 22 of the hub 12 is formed in one rigid piece with the circular central portion 24 of the hub, but it would also be possible to form the housing portion as a separate member rigidly secured to the central portion. Formed at the outboard end of the housing portion 22 of the hub 12 is an annular mounting surface 26. The mounting surface 26 faces radially outwardly of the rotor hub 12 and circumscribes the elongated central opening 28 in the housing portion 22.

The butt or inboard end of the rotor blade 16 extends into the central opening 28 of the housing portion 22 of the rotor hub 12. The inboard end of the blade 16 is formed as a mounting shaft 30 that is rigidly connected to the airfoil portion 32 of the rotor blade. The mounting shaft 30 is substantially smaller in diameter than the opening 28 in the housing portion 22 of the hub 12 so as to permit movement of the blade relative to the housng, as will be described hereinafter. The end 34 of the mounting shaft 30 opposite the airfoil 32 is enlarged or flanged to provide a second annular mounting surface 36 that encircles the shaft and faces radially outwardly from the central axis 14 of the rotor hub 12.

Mounted between the two mounting surfaces 26 and 36 are three annular laminated elastomeric bearings 38, 40 and 42. Each laminated bearing 38, 40 and 42 surrounds a central opening which passes through the bearing and which is sized such that the inner circumferential surface of each bearing is, with one exception, spaced in a direction radially of the shaft 30 from the outer circumference of the shaft. The only contact between the shaft 30 and the bearings 38, 40 and 42 is at the inboard end of the bearing 38. Each of the bearings 38, 40 and 42 is comprised of a plurality of alternating and bonded together annular layers or laminations of elastomeric material and substantially non-extensible material. The elastomeric and non-extensible laminations alternate both radially of and along the longitudinal axis 18 of the blade 16. As can be seen from the drawing, each lamination in each of the bearings 38, 40 and 42 is inclined, rather than parallel to, the longitudinal axis 18 of the rotor blade 16, yet no lamination is perpendicular to the longitudinal axis of the blade. The laminations of the bearings 38 and 40 are frustroconically shaped, while the laminations of the bearing 42 are spherically shaped. The elastomeric laminations are preferably formed of natural rubber, while the non-extensible laminations are preferably formed of steel. Other elastomeric and non-extensible materials may be substituted for the rubber and steel where appropriate. Alternate elastomeric materials may include synthetic rubbers, while alternate non-extensible materials may include other metals, sheets of fiberglass and sheets of reinforced plastic.

Figure 2:
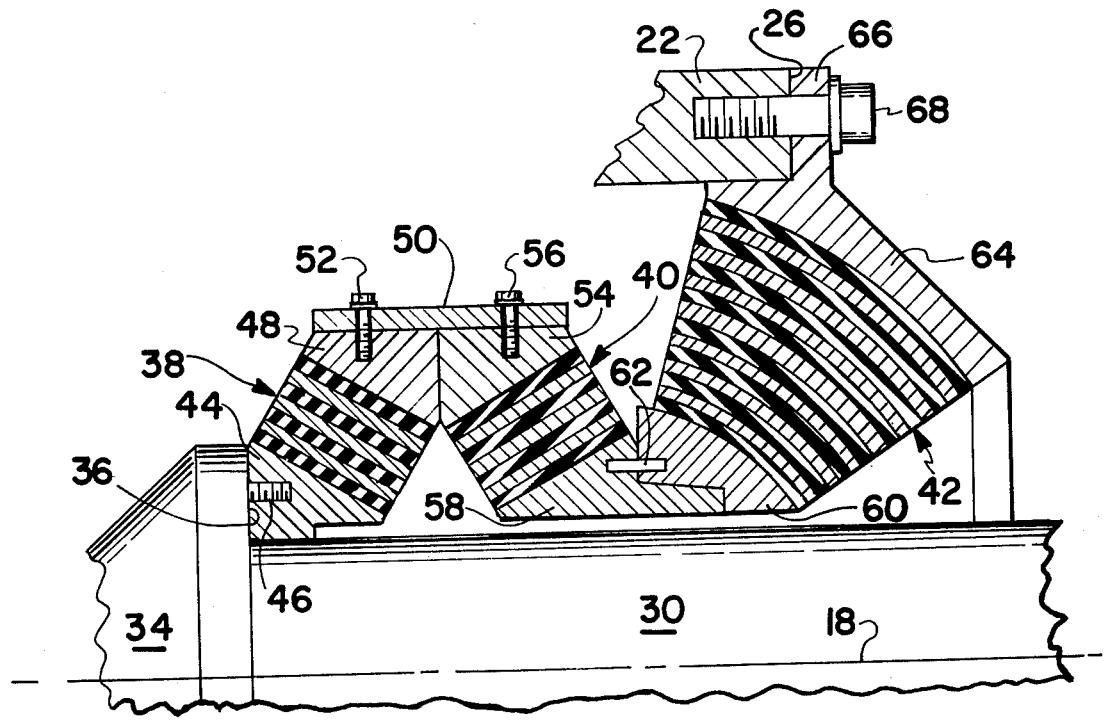
FIG. 2 is a partial view of the rotor blade retention system of FIG. 1, on an enlarged scale.

At each end of each laminated bearing 38, 40 or 42, as best shown in FIG. 2, a relatively massive, annular rigid end plate is bonded to an adjacent elastomeric lamination. One end plate 44 of the conical laminated bearing 38 is secured in face-to-face, compression load transmitting relationship with the mounting surface 36 of the enlarged end 34 of the shaft 30. In one suitable fastening arrangement, lug bolts 46 pass through holes in the enlarged shaft end 34 and are screwed into threaded bores in the end plate 44. Radially extending splines 45 formed on the inner circumference of the end plate 44 mesh with similar splines formed on the outer circumference of the shaft 30 to transmit rotational movements of the shaft to the bearing 38. The opposite end plate 48 of the conical bearing 38 is located adjacent and is secured in any convenient manner to an annular rigid ring 50 of larger diameter than the bearing 38. To secure the end plate 48 to the ring 50, lug bolts 52 may pass through openings formed in and adjacent one edge of the annular ring and may be screwed into threaded bores in the end plate.

Juxtaposed with the end plate 48 of the conical bearing 38 and with the ring 50 is one end plate 54 of the second conical bearing 40. The two end plates 48 and 54 are held together in face-to-face contact by the rigid ring 50, to which the end plate 48 is secured as described above and to which the end plate 54 is also secured, for example, in a similar manner by lug bolts 56. The opposite end plate 58 of the conical bearing 40 is secured to the radially innermost end plate 60 of the spherical laminated bearing 42. The connection between the two end plates 58 and 60 is effected by rigid steel pins 62 and adhesive, for example. The steel pins 62 extend parallel to the longitudinal axis 18 of the rotor blade 16 and are received in aligned bores formed in both end plates 58 and 60. The adhesive is applied along the adjacent, contacting surfaces of the two end plates. Torsional movement is transmitted between the bearings 40 and 42 by the pins 62, while the adhesive ensures that the end plates 58 and 60 remain in contact. Other fastening arrangements may be used or the end plates 58 and 60 may be formed in one piece. Although separate end plates offer manufacturing conveniences, a one-piece member incorporating two end plates may avoid assembly difficulties.

The radially outermost end plate 64 of the spherical laminated bearing 42 has a flange 66 that extends radially outwardly of the longitudinal axis 18 of the blade 16 to lie in face-to-face contact with the mounting surface 26 formed on the bearing housing 22 of the rotor hub 12. The flange 66 is secured to the mounting surface 26 by lug bolts 68 that pass through openings in the flange and are screwed into threaded bores in the mounting surface 26. When assembled as described above, the blade retention system provides a serial load transmitting path through all of the laminated bearings 38, 40 and 42 which will retain the rotor blade 16 in place against centrifugal loads, as will be described in the following paragraphs.

In operation, when the rotor hub 12 is being rotated by its drive assembly (not shown), a centrifugal load is exerted on the rotor blade 16 along its longitudinal axis 18 and tends to force the blade 16 radially away from the hub. The centrifugal load is transferred from the blade 16 through the enlarged end 34 of the mounting shaft 30 to the laminated elastomeric bearing 38. Since the three laminated elastomeric bearings 38, 40 and 42 are connected together in serial load transmitting relationship, the centrifugal load is transmitted through compression loading of the various elastomeric and inextensible layers of the bearings into the mounting surface 26 of the housing portion 22 of the hub 12.

While the laminated elastomeric bearings 38, 40 and 42 are resisting the centrifugal load on the rotor blade 16, they also permit the blade some freedom to move in response to aerodynamic forces exerted in directions other than along the length of the blade. Such forces may produce, for example, lead-lag and flapping motions of the rotor blade, which are pivotal movements of the blade about axes perpendicular to its longitudinal axis. The spherically shaped laminated bearing 42 accommodates such motions through shearing of the elastomeric layers in the bearing. The two frustroconically shaped bearings 38 and 40, on the other hand, are shaped and oriented such that translational movements of the rotor blade 16 radially of its longitudinal axis 18 or pivotal movements of the blade about axes transverse to its longitudinal axis will always load the two bearings primarily in compression. In particular, the bearings 38 and 40 are oppositely oriented such that the laminations of each bearing taper toward the other bearing. The same result could be achieved by having the laminations of each bearing taper away from the other bearing. The high compression stiffness of the bearings 38 and 40, which is common to all laminated bearings, causes the two bearings to act as an essentially rigid unit that transmits non-axial translational, lead-lag and flapping motions of the blade 16 to the spherical bearing 42 without significant deflection. All three bearings 38, 40 and 42 will, however, deflect to accommmodate rotational movements of the blade 16 about its longitudinal axis 18 to change the pitch of the blade. With pitch change motion of the blade 16, each elastomeric lamination in each of the bearings 38, 40 and 42 is deflected in shear so that all three bearings share the pitch change or torsional motion.

The blade retention system of the present invention offers an effective substitute for the previously discussed rotor blade retention system illustrated in the patents to Rybicki. The present retention system offers the ability to accommodate generally the same centrifugal loads, pitch change motions, lead-lag and flap motions as the United Aircraft (Rybicki) system within approximately the same volume space. At the same time, only a single connection is required between the rotor blade 16 and the retention system 20 and thus only a single area of contact between the retention system and the rotor blade. Unlike the United Aircraft system, the present invention has no possibility of frictonal wear at an intermediate connection between the blade and the retention system.

The present invention also offers advantages over the retention system of Gorndt et al. U.S. Pat. No. 3,862,812, which similarly provides only a sngle connection between a rotor blade and its retention system. The present invention uses two conical bearings of relatively small outer dimensions instead of a single large conical bearing as in the Gorndt et al system. The result is not merely a two-for-one replacement, but provides advantages of substantial consequence. Assuming that all bearings incorporate a common elastomer stock with a uniform Young's modulus, the torsional spring rate of each bearing is governed by the square of the distance from the center of the bearing to the radially outermost elastomeric layer. A reduction in the outer diameter of a laminated bearing will therefore effect a more than linearly proportional reduction in the torsional spring rate of the bearing. In turn, a lower torsional spring rate means a greater capacity to accommodate rotational movement in response to a given torsional load. The increased motion accommodation capability of the two conical bearings, as compared to a single large conical bearing, permits a significant reduction in the required rotational motion capability and, therefore, in the overall size of the spherical laminated bearing. A smaller spherical bearing further reduces the space envelope required to accommodate the retention system. Decreasing the space envelope required for the retention system permits a reduction in the size of the rotor hub, which may be a single massive block of metal 3½ to 4 feet in diameter machined to provide the required openings, bearing housing portions and othr structure. Even a relatively modest reduction in the size of the hub can result in a substantial savings in weight and cost of material.

It should be borne in mind that the foregoing discussion only involves connections between the rotor blade 16 and the hub 12 afforded by the blade retention system 20. There are other connections between the rotor hub 12 and the rotor blade 16 which do not provide any substantial retention of the rotor blade. For example, the rotor blade 16, and more specifically the airfoil portion 32 of the blade 16, is coupled to the rotor hub 12 by a pitch horn 70. The pitch horn 70 is connected, at one end, to the airfoil portion 32 of the blade 16 and, at its other end, to a rod end bearing 72 of a pitch control rod. The pitch control rod, which cannot be seen in the drawing, is, in turn, connected in a conventional manner to a swashplate 74 so that movement of the swashplate will cause the blade 16 to vary in pitch about its longitudinal axis 18. Similarly, a lead-lag damper 76, which is of the hydraulic or pneumatic cylinder-piston type, is connected at one end to the enlarged end 34 of the mounting shaft 30 of the blade 16. The damper 76, the opposite end of which is secured to the rotor hub 12, dampens the lead-lag or in-plane motion of the blade 16.

It will be understood that the embodiment described above is merely exemplary and that persons skilled in the art may make many variations and modifications witout departing from the spirit and scope of the invention. For example, wherever two adjacent bearing end plates are utilized in the illustrated embodiment of the invention, a single one-piece member may be substituted, as explained with regard to end plates 58 and 60. All such modifications and variations are intended to be within the scope of the invention as defined in the appended claims.

What is claimed is:

1. A rotor blade retention system for connecting at least one elongated rotor blade to a rotor hub that is rotatable about a central axis, the connected rotor blade normally extending generally radially from the hub and being rotatable with the hub about its central axis, said retention system comprising
    means carried by the rotor blade defining a first mounting surface which is oriented transversely to a longitudinal axis of the rotor blade and which faces generally outwardly relative to the central axis of the rotor hub,
    means carried by the rotor hub defining a second mounting surface which is oriented transversely to the longitudinal axis of the rotor blade, the second mounting surface being spaced from the first mounting surface and facing generally inwardly relative to the central axis of the rotor hub.
    at least three laminated elastomeric bearings connected together in serial compression load transmitting relationship with each other, each laminated bearing including a plurality of alternating and bonded together layers of elastomeric material and substantially inextensible material, each layer of each of the serially interconnected laminated bearings being at least partially inclined relative to the longitudinal axis of the rotor blade and having in section taken radially of the longitudinal axis of the rotor blade at least a portion projecting longitudinally toward an end of the rotor blade, the bearings being mounted to extend between the first and second mounting surfaces so as to restrain through compression loading of each of the bearings the rotor blade against centrifugal loads imposed on the blade during rotation of the blade and the rotor hub.

2. A blade retention system, according to claim 1, wherein the serially interconnected laminated bearings all share pivotal movements of the rotor blade about its longitudinal axis, only one of said serially interconnected laminated bearings being rigidly connected to the rotor blade and the rotor blade being spaced radially relative to its longitudinal axis from at least all portions of the retention system other than said one laminated bearing.

3. A blade retention system, according to claim 1, wherein each layer of at least one of the serially interconnected laminated bearings is a spherically shaped annulus and each layer of at least two others of the serially interconnected laminated bearings is a frustroconically shaped annulus.

4. A blade retention system, according to claim 3, wherein the two laminated bearings that have frustroconically shaped layers are disposed adjacent to each other, the layers of one of said frustroconical laminated bearings tapering in circumference toward one end of the rotor blade and the layers of the other of said frustroconical laminated bearings tapering in circumference toward the other end of the rotor blade.

5. A blade retention system, according to claim 4, wherein the layers of the one frustroconical laminated bearing taper toward the other frustroconical laminated bearing.

6. A blade retention system, according to claim 3, wherein the annular layers of each laminated bearing surround a central opening through said bearing and the central openings of all of the serially interconnected laminated bearings are axially aligned, the rotor blade having a mounting shaft portion that lies along the longitudinal axis of the blade and extends through said aligned central openings, the shaft portion of the blade having an outer circumference that is smaller than the smallest inner circumferences of at least two adjacent serially interconnected laminated bearings so that the outer circumferential surface of the shaft portion of the blade is spaced throughout its length from (a) the inner circumferential surfaces of said at least two adjacent serially interconnected laminated bearings and (b) any other structure disposed between remote ends of said at least two adjacent bearings.

7. A rotor blade retention system for connecting at least one elongated rotor blade to a rotor hub that is rotatable about a central axis, the connected rotor blade normally extending generally radially from the hub and being rotatable with the hub about its central axis, said retention system comprising:
   a. a bearing housing portion of the rotor hub, said housing portion defining (i) an opening facing radially outwardly fo the rotor hub and (ii) a first annular mounting surface adjacent to and circumscribing said opening; and
   b. three laminated elastomeric bearings connected together in serial compression load transmitting relationship, each laminated bearing including a plurality of alternating and bonded together annular layers of elastomeric material and substantially inextensible material, the layers of one laminated bearing being spherically shaped annuli and the layers of the other two laminated bearings being frustroconically shaped annuli, the annular layers of each of the serially interconnected bearings surrounding a central opening through said bearing and all of said central openings being axially aligned, the rotor blade having a mounting shaft portion which extends along a longitudinal axis of the blade into the opening of the housing portion of the rotor hub and through each of the aligned central openings of the serially interconnected laminated bearings, the shaft portion having means defining a second annular mounting surface concentric with and oriented transversely of the longitudinal axis of the rotor blade, the serially interconnected laminated bearings being mounted to extend between the first and second mounting surfaces, the laminated bearing having spherically shaped layers being adjacent and connected to the first mounting surface and the laminated bearings having frustroconically shaped layers being mounted in opposed orientation to each other between the spherical laminated bearing and the second mounting surface, one of said frustroconical laminated bearings being connected to the second mounting surface and the other frustroconical bearing being connected to the spherical laminated bearing, the bearings being disposed relative to the shaft portion of the rotor blade such that between the first and second mounting surfaces the shaft portion is spaced from at least all of the retention system other than said one frustroconical bearing in directions radially of the longitudinal axis of the rotor blade and all three laminated bearings share pivotal movements of the blade about its longitudinal axis.

8. A rotor blade retention system for connecting at least one elongated rotor blade to a rotor hub that is rotatable about a central axis, the connected rotor blade normally extending generally radially from the hub and being rotatable with the hub about its central axis, said retention system comprising:
   a. a bearing housing portion of the rotor hub, said housing portion defining (i) an opening facing radially outwardly of the rotor hub and (ii) a first annular mounting surface adjacent to and circumscribing said opening; and
   b. at least three laminated elastomeric bearings connected together in serial compression load transmitting relationship with each other, each laminated bearing including a plurality of alternating and bonded together annular layers of elastomeric material and substantially inexpensive material, each layer of each of the serially interconnected laminated bearings being at least partially inclined relative to a longitudinal axis of the rotor blade and having in section taken radially of the longitudinal axis of the rotor blade at least a portion projecting longitudinally toward an end of the rotor blade, the annular layers of each of the serially interconnected bearings surrounding a central opening through said bearing and all of said central openings being axially aligned, the rotor blade having a mounting shaft portion which extends along the longitudinal axis of the blade into the opening of the housing portion of the rotor hub and through each of the aligned central openings of the serially interconnected laminated bearings, the shaft portion having means defining a second annular mounting surface generally concentric with and oriented transversely of the longitudinal axis of the rotor blade, the serially interconnected laminated bearings being mounted to extend between the first and second mounting surfaces.

* * * * *

UNITED STATES PATENT OFFICE
CERTIFICATE OF CORRECTION

PATENT NO. : 4,028,002
DATED : June 7, 1977
INVENTOR(S) : Robert H. Finney et al It is certified that error appears in the above-identified patent and that said Letters Patent are hereby corrected as shown below:

Column 2, line 25, "Teflon" should be -- Teflon® -- .

Column 2, line 60, "frustoconically" should be -- frustroconically -- .

Column 2, line 61, "frustoconically" should be -- frustroconically -- .

Column 8, line 11, "othr" should be -- other -- .

Column 8, line 39, "witout" should be -- without -- .

Column 8, lines 63 and 64, delete "and facing generally radially inwardly relative to the central axis of the rotor hub"

Column 10, line 62, "inexpensive" should be -- inextensible -- .

Signed and Sealed this

Thirteenth Day of December 1977

[SEAL]

Attest:

RUTH C. MASON
Attesting Officer

LUTRELLE F. PARKER
Acting Commissioner of Patents and Trademarks